United States Patent [19]
Hänsel et al.

[11] Patent Number: 5,540,117
[45] Date of Patent: Jul. 30, 1996

[54] LOCKING SYSTEM FOR ARTICULATED FITTINGS OF CAR SEATS, IN PARTICULAR FOR WOBBLE FITTINGS

[75] Inventors: Richard Hänsel, Flonheim; Thomas Neumer, Kaiserslautern; Karin Becker, Rockenhausen, all of Germany

[73] Assignee: Keiper Recaro GmbH & Co., Remscheid, Germany

[21] Appl. No.: 356,638

[22] Filed: Dec. 15, 1994

[30] Foreign Application Priority Data

Dec. 17, 1993 [DE] Germany ........................ 43 43 204.2
Nov. 7, 1994 [DE] Germany ........................ 44 39 644.9

[51] Int. Cl.⁶ ............................................. G05G 5/00
[52] U.S. Cl. .................. 74/577 SF; 74/575; 74/576; 74/577 R; 74/577 M; 297/367
[58] Field of Search .................... 74/575, 576, 577 R, 74/577 M, 577 S, 577 SF, 578; 292/197, 202; 297/365, 367, 362

[56] References Cited

U.S. PATENT DOCUMENTS 4,223,947  9/1980  Cremer .
4,611,853  9/1986  Lehmann et al. .
5,154,476  10/1992  Haider et al. ...................... 297/367

FOREIGN PATENT DOCUMENTS 1580011   4/1970  Germany ...................... 297/367
3247946C2 7/1984  Germany .
2085959   5/1992  United Kingdom ............ 297/367

Primary Examiner—Rodney H. Bonck
Assistant Examiner—Chong H. Kim
Attorney, Agent, or Firm—Wigman, Cohen, Leitner & Myers, P.C.

[57] ABSTRACT

A locking system for articulated fittings of car seats with a free-swivelling backrest. In particular, a wobble fitting is used with the articulated fitting and is made up of at least one notch, with which a pawl engages in a locking position, and a first clamping surface as the contact surface for an operating and safety element. The operating and safety element can be rotated around a swivel axis so as to increase the clamping force exerted on the pawl and is spring-loaded to secure the pawl in the locking position by using a second clamping surface, which rests without self-locking against the first clamping surface of the pawl. The operating and safety element includes a catch surface such that, when the pawl rests against the first clamping surface, it prevents the pawl from exerting an opening moment on the operating and safety element.

17 Claims, 4 Drawing Sheets

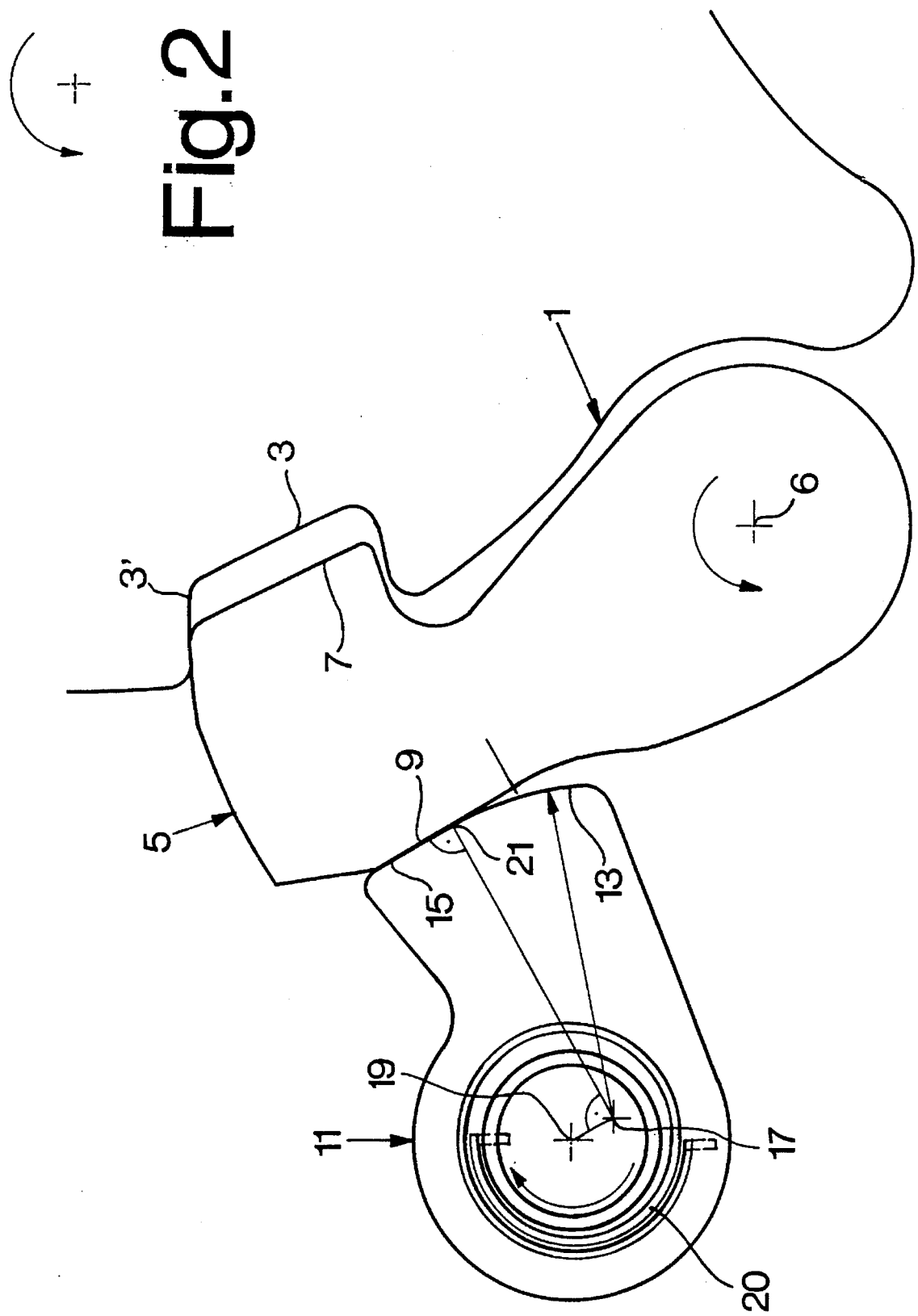

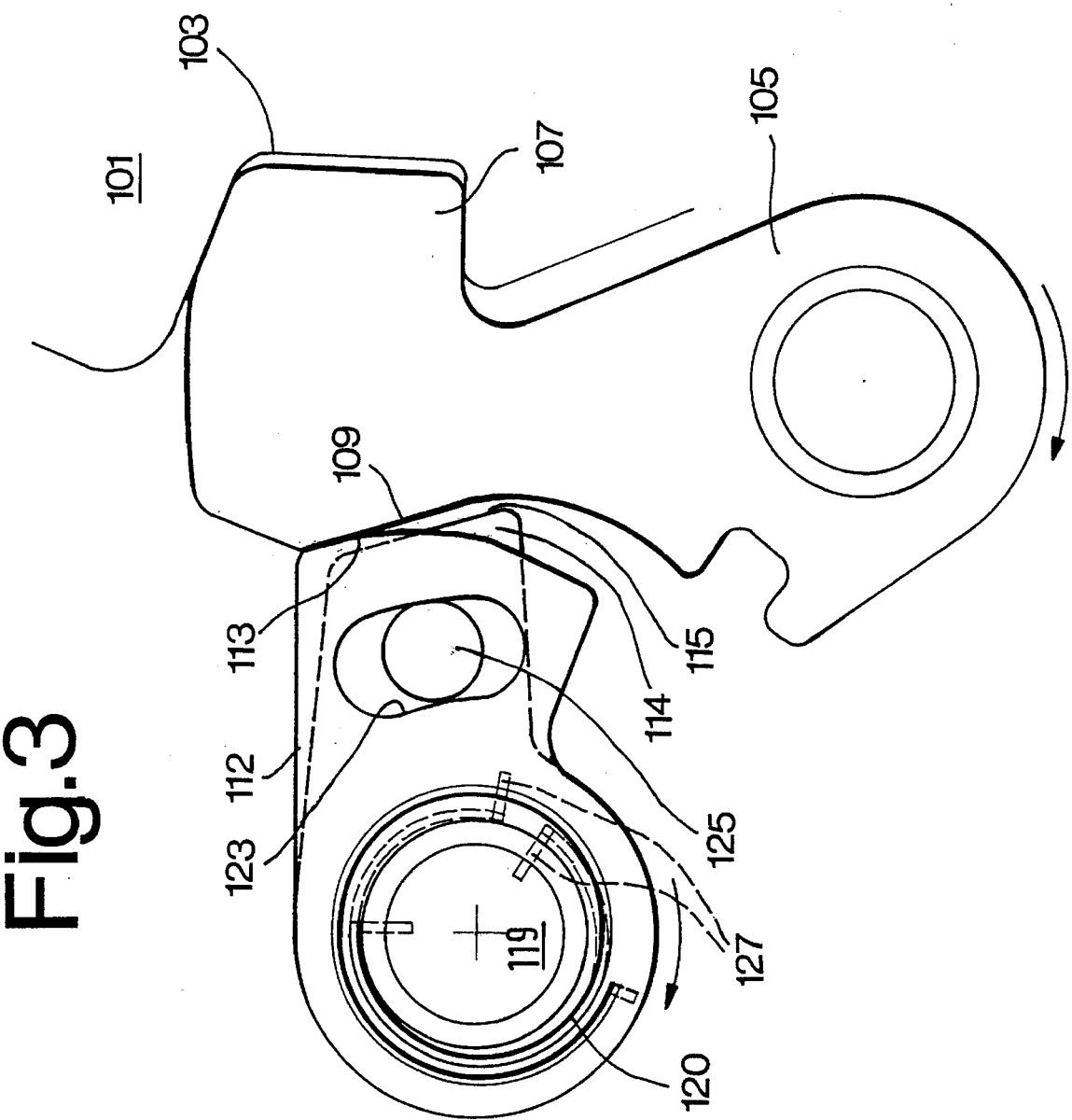

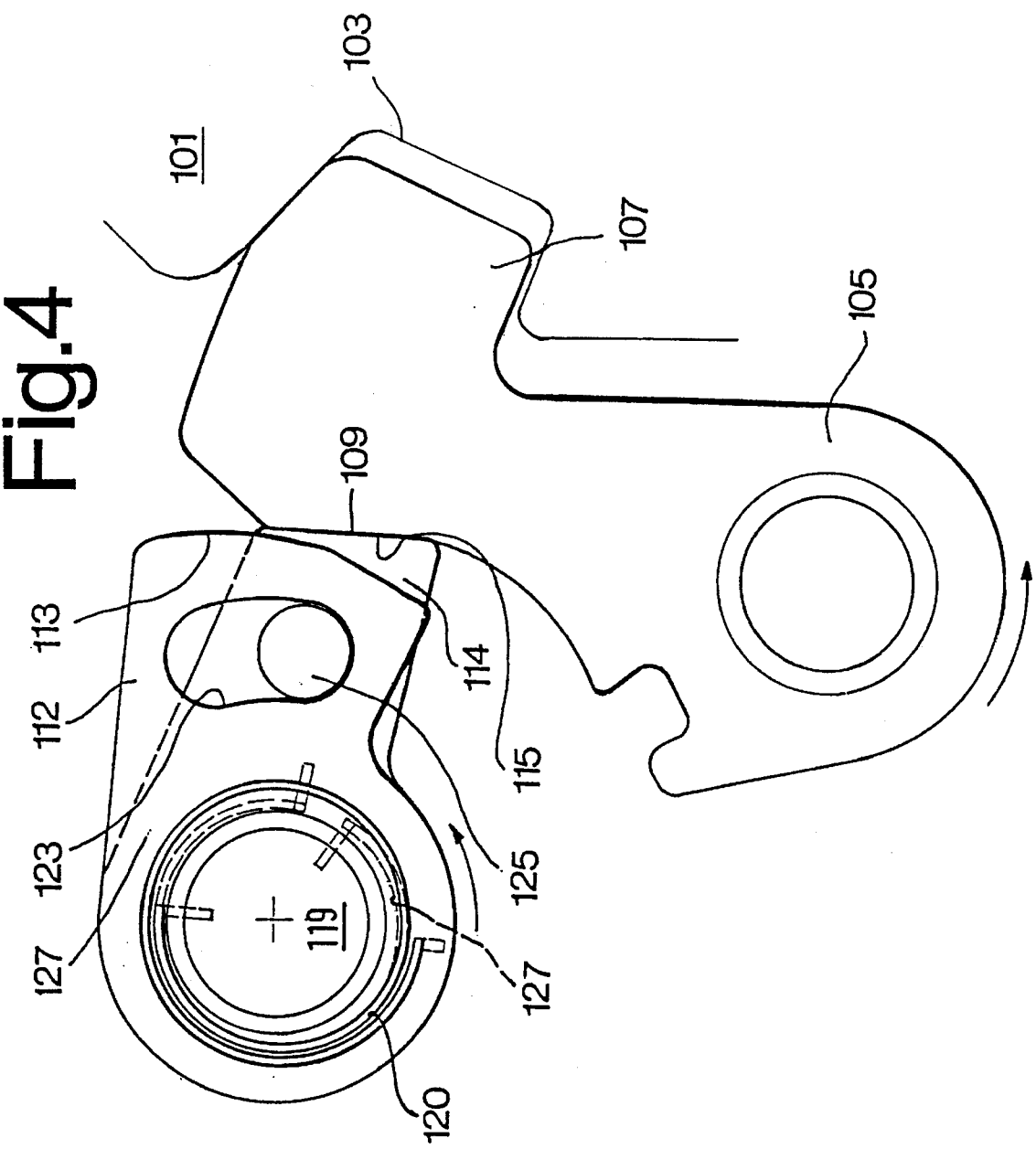

LOCKING SYSTEM FOR ARTICULATED FITTINGS OF CAR SEATS, IN PARTICULAR FOR WOBBLE FITTINGS

BACKGROUND OF THE INVENTION

The invention relates to a locking system for articulated fittings of car seats with free-swiveling backrest, in particular for wobble fittings.

In prior art locking systems of this kind, the fitting exhibits one notch or several notches, with which one tooth or several teeth of a pawl engages/engage, thus defining a locking position. To hold the pawl in the locking position, there is a swivelable bolt. In the swivel region of the bolt the pawl includes a flat or slightly curved clamping surface. Preferably, the bolt has an eccentric shape and a curved clamping surface on the side facing the pawl. To ensure the locking position of the pawl, the bolt is swiveled until the two clamping surfaces touch under tension. The bolt is held in this clamping position by means of a spring. The two clamping surfaces are kept in a self-locked contact to ensure that the bolt cannot be swung back by means of an impulse so that the clamping surfaces no longer touch one another, which makes it difficult to operate the bolt.

OBJECTS AND SUMMARY OF THE INVENTION

A primary object of the present invention is to provide an improved locking system for articulated fittings of car seats, in particular wobble fittings.

This problem is solved according to the invention by means of a locking system with the features of claim 1. Other advantageous embodiments are the subject matter of the dependent claims.

If the operating and safety element is swung back somewhat by means of a moment exerted on the pawl, the first clamping surface of the pawl also rests against the catch surface of the operating and safety element. Since the catch surface and the first clamping surface of the pawl rest against each other, without the pawl exerting an opening moment on the operating and safety element, the catch surface prevents the operating and safety element from swinging back further and the locking system is prevented from opening.

The operating and safety element can be formed of a single element, e.g., a bolt. Such construction has the advantage that the number of components of the locking system and the tolerances are kept low.

However, the operating and safety element can also be made of a clamping bolt and a separate catch bolt. Such construction has the advantage that in a crash a torque will act, only on the clamping bolt and not on the catch bolt. Therefore, the catch bolt does not rotate, when the pawl comes to rest against it. Furthermore, when the locking system is opened, the catch bolt swings first into a position in which the pawl cannot come to rest against it, even when unlocked under load. Therefore, the locking system can be easily opened even in panic situations.

A flat first clamping surface on the pawl and a flat catch surface on the operating and safety element are advantageous, since they make it possible in a simple manner to realize a large contact surface and they are easy to produce.

Since the locking position of the fitting is the same for varying mating depths of the tooth of the pawl into the appropriate notch, the locking state of the locking system is guaranteed not only when the pawl of the operating and safety element touches the second clamping surface but also when it touches the operating and safety element at the catch surface.

Since the tooth engages with the notch without play, there is no play in the locking position of the fitting in the entire locking system.

Since no self-locking occurs between the two clamping surfaces and along the contact points of tooth and notch, a wedge connection is prevented.

BRIEF DESCRIPTION OF THE DRAWINGS

The invention is explained in detail in the following with reference to two embodiments shown in the drawings, wherein:

FIG. 2 is a schematic drawing of a first embodiment showing a bolt in a catch position with the pawl;

FIG. 3 is a schematic drawing of a second embodiment showing a clamping bolt in a clamping position with the pawl; and FIG. 4 is a schematic drawing of a second embodiment showing a catch bolt in a catch position with the pawl.

DETAILED DESCRIPTION OF THE PREFERRED EMBODIMENTS

Figure 1:
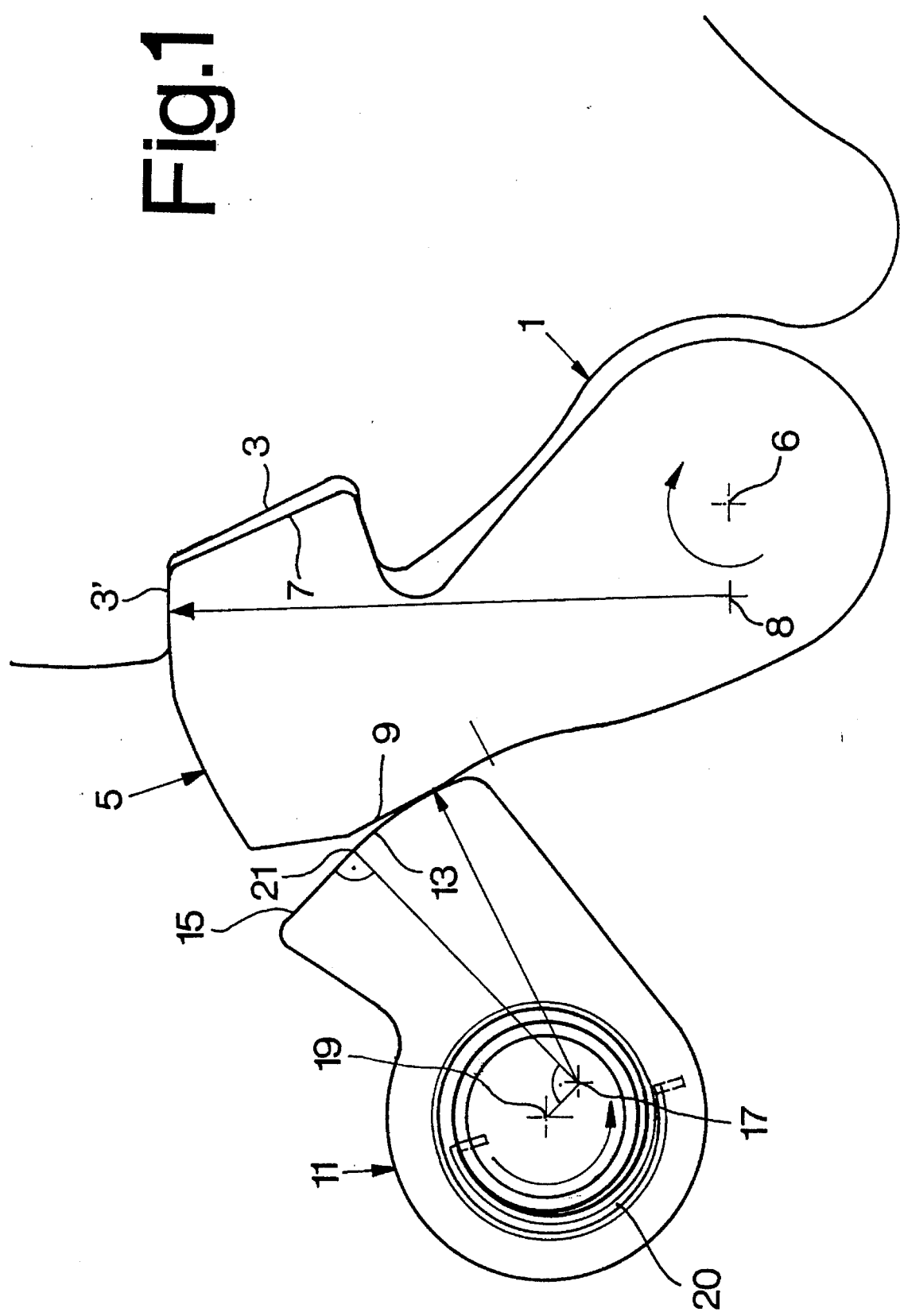
FIG. 1 is a schematic drawing of a first embodiment showing a bolt in a clamping position with the pawl.

As seen in FIGS. 1 and 2, the first embodiment shows a locking system for articulated hinges of car seats, in particular, wobble fittings, which allow for an unrestrained swivelling motion. When the locking system of the present invention is unlocked, the backrest of a car seat can be folded against the seat surface with such articulated fittings without having to operate the backrest setting mechanism. In the locked state the locking system does not allow the backrest to swivel.

The articulated fitting includes a fitting 1 with notch 3, which can be rotated about an axis which is parallel to the hinge axis or, in the case of a wobble fitting, about its gear axis. It could also be rotated around the hinge axis. Notch 3 has an approximately trapezoidal contour with rounded corners. The longer side of the trapezoid points toward the outside of the fitting 1.

Pawl 5 can be swivelled with respect to the fitting 1 around an axis of rotation 6 and is positioned to engage with notch 3 of fitting 1 in the swivel direction toward the fitting 1 by means of tooth 7. The positioning and shape of fitting 1 and pawl 5 are chosen in such a manner that by swivelling pawl 5, the tooth 7 is guided into notch 3. The pawl has a clamping and contact surface for receiving and operating and safety element.

Tooth 7 of pawl 5 is intended to engage with the notch 3 without play, when utilizing the maximum engagement depth. Therefore, tooth 7 also is provided with an approximately trapezoidal shape which conforms to the shape of notch 3. The side face of tooth 7 that corresponds to trapezoidal leg and the side face 3' of notch 3 are designed in such a manner that the majority of the length of the contour lines terminates approximately in the direction of swivel, namely, on a circular arc around a center of curvature 8, which is offset with respect to the axis of rotation 6 of the pawl 5, or along a straight line. The precise course of the contour lines depends on how fitting 1 can move relative to the axis of rotation 6 of the pawl 5. Even if the tooth 7 is not engaged with the notch 3 with the maximum engagement depth, fitting 1 will nevertheless have about the same locking position as in the case of the maximum engage depth being utilized. Thus, the locking position of fitting 1 is independent of the engagement depth of the pawl tooth 7.

On the side of pawl 5 opposite tooth 7 in the swivel direction, pawl 5 is provided with a flat first clamping surface 9, which extends approximately perpendicular relative to the swivel direction. Bolt 11 can be swivelled with respect to pawl 5 in such a manner that the first clamping surface 9 lies in a swivel region of bolt 11. Bolt 11 swivels around a swivel axis 19. Along the edge facing pawl 5 in the locking position bolt 11 includes a second clamping surface 13, which at one extent, corresponds to the smallest adjustable clamping of the pawl 5, and to the other extent, corresponds to the largest adjustable clamping.

Second clamping surface 13 of bolt 11 is cylindrically curved about its axis of curvature 17. Axis 17 lies parallel to the swivel axis 19 and is offset with respect to said swivel axis which is parallel to the swivel direction. A plane, which lies perpendicular to this path of displacement and which contains the axis of curvature 17, intersects the second clamping surface 13 at right angles to a line 21, which forms the beginning of the second clamping surface 13. The second clamping surface 13 and the swivel axis 19 lie on different sides of said plane. Starting from this intersecting line 21, the bolt 11 is shaped in such a manner that a catch surface 15 adjoins tangentially the second clamping surface 13.

Therefore, the catch surface 15 runs parallel to the path of displacement between the axis of curvature 17 and the swivel axis 19 and is perpendicular to said plane. A surface is defined by catch surface 15 and second clamping surface 13 which has an area. A point which defines the shortest distance from the swivel axis 19 and the bolt 11 lies on catch surface 15. The end of the catch surface 15 faces away from the second clamping surface 13. All points of the catch surface 15 are at the greatest distance from the swivel axis 19.

The second clamping surface 13 extends away from the catch surface 15. The distance from the swivel axis 19 towards its end increases continuously. The clamping direction of the bolt 11 is the swivel direction from the start of the second clamping surface 13 towards its end. The opening direction is the opposite swivel direction of the bolt 11.

While swivelling out of the release position in the clamping direction, the catch surface 15 is first guided past the first clamping surface 9 of the pawl 5, until the second clamping surface 13 of the bolt 11 touches the first clamping surface 9 of the pawl 5. Preferably, this swivel movement is facilitated by a spring 20, whereby one end of the spring is rigidly connected to the bolt 11 at a distance from the swivel axis 19, and the other end is rigidly connected to the swivel axis 19. As soon as both clamping surfaces 9 and 13 touch, a moment is exerted on the pawl 5. This moment swings pawl 5 more and more in the direction of the fitting 1 until its tooth 7 engages without play with the notch 3 of the fitting 1 with maximum engagement depth. If the countermoment generated by the clamping force and the frictional forces corresponds to the driving moment, then the locking position of the locking system and thus a clamping position of bolt 11 is obtained, as shown in FIG. 1. In the region of the second clamping surface 13 the locking of pawl 5 by means of the bolt 11 is not self-locking, so that the bolt 11 is not wedged. However, the force of the spring 20 suffices to hold the locking system in the locked state when the backrest is under a normal load.

To avoid a wedge connection of the pawl 5, the trapezoidal shapes of the notch 3 and the tooth 7 are chosen in such a manner that the fitting 1 exerts an opening moment on the pawl 5, which overcomes the frictional force, so that no self-locking takes place. If the backrest is highly loaded, e.g., in the case of a crash, the force normally holding the pawl in the locking position is overcome by the opening moment exerted by fitting 1. In this manner tooth 7 moves somewhat out of the notch 3 and exerts thereby an opening moment on bolt 11. The force is transferred via the non-self-locking contact point of both clamping surfaces 9 and 13. Therefore, bolt 11 swings sufficiently far in the opening direction that catch surface 15 adjoining the second clamping surface 13 touches the first clamping surface 9. Since the contact in the region of catch surface 15 is without any moment, pawl 5 can no longer cause bolt 11 to swing. The bolt remains in its catch position and holds thereby pawl 5 in its locking position, as illustrated in FIG. 2.

As the bolt 11 continues to swing, e.g., owing to angular momentum during a crash, the pawl 5 is pushed into notch 3 counter to the direction of load, a feature that causes an additional locking effect, namely, that a closing moment on the bolt 11 is generated by means of pawl 5.

Where the load is removed from the backrest, the opening moment of fitting 1 on the pawl decreases. Then, spring 20 facilitating the swivelling in the clamping direction swings bolt 11 back again into the clamping position. Tooth 7 is simultaneously pushed into notch 3. In this manner the position depicted in FIG. 1 is reached again.

In order to swing the backrest free, bolt 11 is swung in the opening direction without pawl 5 exerting any opening moment. Thus, the catch surface 15 can be guided past the first clamping surface 9. After the catch surface 15 has released pawl 5, tooth 7 is pushed out of notch 3 because of the missing self-locking at the start of the swivel moment of the backrest. Not until the seat backrest has been swung back again into its starting position spring 20 can swing bolt 11, which in turn, can swing pawl 5 into that position in which tooth 7 can fall into notch 3.

As with the first embodiment, the second embodiment includes fitting 101, and notch 103, in which pawl 105 engages with a tooth 107 for locking, whereby pawl 105 carries the first clamping surface 109.

The operating and safety element includes a clamping bolt 112, which carries a second clamping surface 113, and a catch bolt 114, which carries a catch surface 115. Clamping bolt 112 and catch bolt 114 are arranged side-by-side and can be rotated around the same swivel axis 119. Clamping bolt 112 is provided with a curved slot 123, whose center of curvature coincides with the center of swivel axis 119. Catch bolt 114 includes a pin 125, which engages with the slot 123 of clamping bolt 112. Pin 125 can be an embossed material member of the catch bolt 114. Clamping bolt 112 and catch bolt 114 are coupled together in the swivel direction by means of the slot-pin connection producing a backlash in the swivel direction. Instead, slot 123 could be included at catch bolt 114, whereas then clamping bolt 112 would carry the pin 125.

As with the first embodiment, clamping bolt 112 is spring loaded to increase the clamping force relative to the pawl 105, preferably by means of a first spring 120. A second spring 127, which is only indicated in the drawing, endeavors to hold the catch bolt 114 in its catch position, illustrated in FIGS. 3 and 4. In this catch position, catch bolt 114 is aligned in such a manner with pawl 105 that the first clamping surface 109 and the catch surface 115 are opposite each other. The second spring 127 could also be replaced by two springs, which exert opposing torques on catch bolt 114. As FIG. 3 also shows, when catch bolt 114 is in the catch position, the pin 125 is between the two ends of slot 123, preferably in the center, when clamping bolt 112 is in its clamping position.

With respect to the details of the second embodiment, in particular the geometrical details that were described above but are not described below, reference is made to the description made in connection with the first embodiment.

To lock the locking system, first spring 120 swings clamping bolt 112 so as to increase the clamping force until the clamping position is reached, e.g., clockwise, according to FIG. 3. The requisite swivel direction depends on where the center of curvature of the second clamping surface 113 is relative to the swivel axis 119 and relative to pawl 105. However, as in the first embodiment, another swivel direction can be used by providing an alternative design of clamping bolt 112. Catch bolt 114 is swung into its catch position by means of a second spring 127. Owing to the movement of the clamping bolt 112, tooth 107 of pawl 105 is pushed clockwise into the notch 103 of the fitting 101, as shown in FIG. 3.

In the event of a crash, fitting 101 pushes the tooth 107 of the pawl 105 a short distance out of its notch 103, thus swivelling the pawl 105 counterclockwise, as shown in FIG. 4. Clamping bolt 112 swivels counterclockwise, as seen in the viewing direction of FIG. 4, against the force of first spring 120 owing to the moment exerted by pawl 105. Catch bolt 114, which receives no moment, remains at rest., i.e., in its catch position.

As soon as flat catch surface 115 rests against first clamping surface 109, which is also flat, the swivel movement of both pawl 105 and clamping bolt 112 is terminated. In this position tooth 107 of pawl 105 largely remains in notch 103, as described in the first embodiment, so that the locking system remains unopened.

A Bowden wire may be used to open the locking system and permit the seat backrest to swivel freely, catch bolt 114 is swung counterclockwise into its release position, as seen from the viewing direction of FIGS. 3 and 4, for example, without catch surface 115 and first clamping surface 109 touching each other. As soon as pin 125 rests against the end of slot 123, clamping bolt 112 is moved into its release position, thus releasing the pawl 105, as in the first embodiment, and releasing itself from notch 103. By separating—in chronological sequence—the opening between the swivelling of catch bolt 114 and the releasing of the clamping bolt 112, jamming is prevented even when opening under a load.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. Locking system for articulated fittings for car seats with free-swiveling backrest, comprising:

a) a fitting comprising at least one notch;

b) a pawl having a tooth which engages said pawl in a locking position with said notch of said fitting; said pawl having a clamping and contact surface for receiving an operating and safety element;

c) said operating and safety element for securing said pawl in a locking position including a and contact clamping surface for engaging the contact clamping and contact surface of said pawl; said safety element including a spring to increase a clamping force exerted on the pawl; whereby said operating and safety element secures the pawl in a locking position by engagement of its clamping and contact surface against the clamping and contact surface of said pawl;

d) said operating and safety element further including a catch surface which prevents the pawl from exerting an opening moment on the operating and safety element;

wherein the contact between the clamping and contact surface of the pawl and the clamping and contact surface of the operating and safety element is not self-locking; and wherein further the catch surface comes into contact with the clamping and contact surface when the load acting on the pawl from the fitting exceeds the retaining force of the operating and safety element, thereby making the operating and safety element tree of an opening moment.

2. Locking system, as claimed in claim 1, wherein the operating and safety element is a bolt, and wherein the catch surface of said safety element is located adjacent the clamping surface of said safety element.

3. Locking system for articulated fittings for car seats with free-swiveling backrest, comprising:

a) a fitting comprising at least one notch;

b) a pawl having a tooth which engages said pawl in a locking position with said notch of said fitting; said pawl having a clamping and contact surface for receiving an operating and safety element;

c) said operating and safety element for securing said pawl in a locking position including a clamping and contact surface for engaging the clamping and contact surface of said pawl: said safety element including a spring to increase a clamping force exerted on the pawl; whereby said operating and safety element secures the pawl in a locking position by engagement of its clamping and contact surface against the clamping and contact surface of said pawl:

d) said operating and safety element further including a catch surface which prevents the pawl from exerting an opening moment on the operating and safety element;

wherein the operating and safety element is a bolt, and wherein the catch surface of said operating and safety element is located adjacent the clamping and contact surface of said safety element; and wherein an end of said catch surface that faces away from the clamping and contact surface of the opening and safety element is at the greatest distance of all points of the catch surface from a swivel axis of said bolt.

4. Locking system for articulated fittings for car seats with free-swiveling backrest, comprising:

a) fitting comprising at least one notch;

b) a pawl having a tooth which engages said pawl in a locking position with said notch of said fitting; said pawl having a clamping and contact surface for receiving an operating and safety element;

c) said operating and safety element for securing said pawl in a locking position including a clamping and contact surface for engaging the clamping and contact surface of said pawl; said safety element including a spring to increase a clamping force exerted on the pawl; whereby said operating and safety element secures the pawl in a locking position by engagement of its clamping and contact surface against the clamping and contact surface of said pawl;

d) said operating and safety element further including a catch surface which prevents the pawl from exerting an opening moment on the operating and safety element; and wherein the operating and safety element includes a clamping bolt, which carries the clamping and contact surface of the operating and safety element, and a catch bolt which carries the catch surface.

5. Locking system, as claimed in claim 4, wherein said clamping bolt and said catch bolt are arranged side-by-side, are rotatable about the same swivel axis, and are coupled together in the swivel direction by means of the slot-pin connection thereby producing a backlash in the swivel direction.

6. Locking system, as claimed in claim 4 further including at least one spring for holding said catch bolt in a position directed toward the pawl.

7. Locking system, as claimed in claim 1, wherein said operating and safety element includes a flat catch surface and a safety element and said pawl includes, and a flat first clamping and contact surface.

8. Locking system, as claimed in claim 1, wherein said tooth and said notch have shape that allow different engagement depths of the tooth in said notch, when the fitting is in the locking position.

9. Locking system, as claimed in claim 1, wherein said tooth engages said notch without play.

10. Locking system, as claimed in claim 1, wherein when said tooth engages said notch, it rests against said notch without a closing moment.

11. Locking system for articulated fittings for car seats with free-swiveling backrest comprising:

a) a fitting comprising at least one notch;

b) a pawl having a tooth which engages said pawl in a locking position with said notch of said fitting; said pawl having a clamping and contact surface for receiving an operating and safety element;

c) said operating and safety element for securing said pawl in a locking position including a clamping and contact surface for engaging the clamping and contact surface of said pawl; said safety element including a spring to increase a clamping force exerted on the pawl; whereby said operating and safety element secures the pawl in a locking position by engagement of its clamping and contact surface against the clamping and contact surface of said pawl;

d) said operating and safety element further including a catch surface which prevents the pawl from exerting an opening moment on the operating and safety element;

wherein the operating and safety element is a bolt, and wherein the catch surface of said operating and safety element is located adjacent the clamping and contact surface of said operating and safety element;

wherein a surface defined by said catch surface and said clamping and contact surface of said operating and safety element has an area and wherein further a point which defines the shortest distance from the swivel axis of said bolt lies on the catch surface;

wherein and end of said catch surface that faces away from the clamping and contact surface of the operating and safety element is at the greatest distance of all points of the catch surface from a swivel axis of said bolt.

12. Locking system, as claimed in claim 5, further including at least one spring for holding said catch bolt in a position directed toward the pawl.

13. Locking system for articulated fittings, in particular wobble fittings, for car seats with a free-swiveling backrest, comprising:

a) a fitting comprising at least one notch;

b) a pawl having a tooth which engages said pawl in a locking position with said notch of said fitting; said pawl having a first clamping surface for receiving an operating and safety element;

c) said operating and safety element for securing said pawl in a locking position including a second clamping surface for engaging the first clamping surface of said pawl; said safety element including a spring to increase the clamping force exerted on the pawl; whereby said operating and safety element secures the pawl in said locking position by said engagement;

d) said operating and safety element further including a catch surface which prevents the pawl from exerting an opening moment on the operating and safety element.

14. Locking system, as claimed in claim 13, wherein the operating and safety element is a bolt, and wherein the catch surface of said safety element is located adjacent the second clamping surface of said safety element.

15. Locking system, as claimed in claim 13, wherein said catch surface and said first clamping surface are flat.

16. Locking system, as claimed in claim 2, wherein a surface defined by said catch surface and said clamping and contact surface of said operating and safety element has an area and wherein further a point which defines the shortest distance from the swivel axis of said bolt lies on the catch surface.

17. Locking system, as claimed in claim 14, wherein a surface defined by said catch surface and said clamping and contact surface of said operating and safety element has an area and wherein further a point which defines the shortest distance from the swivel axis of said bolt lies on the catch surface.

* * * * *